SHELVING UNIT

Original Filed Feb. 6, 1956 2 Sheets-Sheet 1

INVENTOR:
Norvin H. Franks,
BY
Chas. Freeman & Wolcott
ATTORNEYS.

SHELVING UNIT
Original Filed Feb. 6, 1956 2 Sheets-Sheet 2
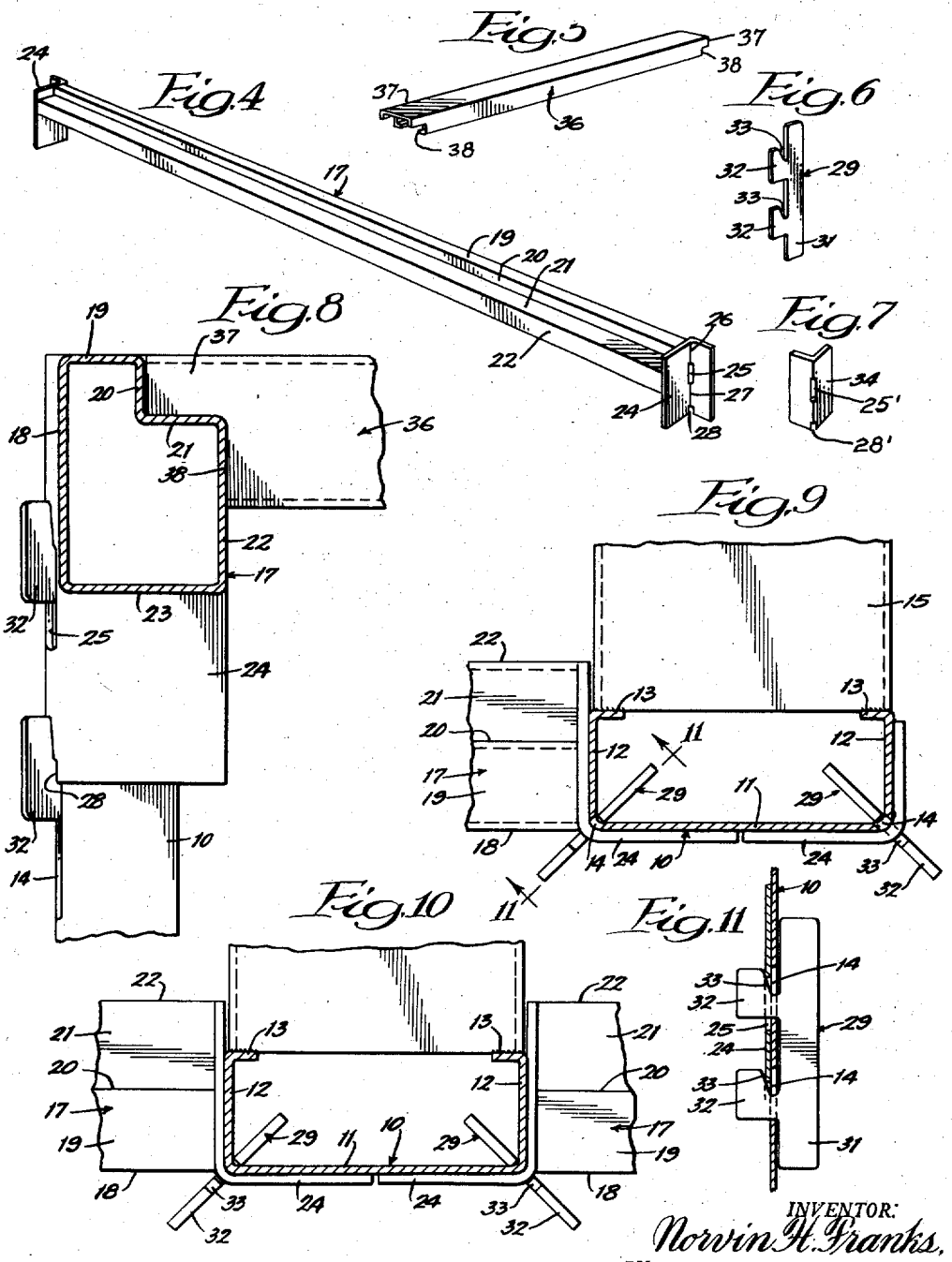
INVENTOR:
Norvin H. Franks,
BY
Dair, Freeman & Molinare
ATTORNEYS.

United States Patent Office

Re. 24,535
Reissued Sept. 16, 1958

24,535

SHELVING UNIT

Norvin H. Franks, Chicago, Ill., assignor to Sturdi-Bilt Engineering Company, Chicago, Ill., a corporation of Illinois Original No. 2,815,130, dated December 3, 1957, Serial No. 563,513, February 6, 1956. Application for reissue January 22, 1958, Serial No. 710,593

4 Claims. (Cl. 211—148)

Matter enclosed in heavy brackets [ ] appears in the original patent but forms no part of this reissue specification; matter printed in italics indicates the additions made by reissue.

This invention relates to shelving units, and more particularly to a knock-down structure which can easily be erected or dismantled to form storage shelving, pallet racks and the like.

Heretofore storage shelving, pallet racks and similar structures have commonly been constructed with separate corner posts detachably connected by cross members and by longitudinal rails or complete rectangular shelves. Such structures involve a large number of detachable joints and the erection or disassembly tends to become a laborious job. Furthermore, the provision of a large number of detachable joints increases the cost of the units.

It is, accordingly, one of the objects of the present invention to provide a shelving unit in which pairs of posts are rigidly and permanently connected by cross members and detachably connected by longitudinal rails to form a complete shelving unit.

According to one feature of the invention, the cross members and posts are permanently welded together to provide a rigid end assembly and the rails are detachably connected to the posts by extremely rigid, but easily assembled and disassembled, double wedging joints to provide an extremely sturdy completed shelving unit. When units of this type are used as pallet racks, it is customary to leave the space between the rails open and to rest pallets directly on the spaced parallel rails. In the event a pallet is placed close to the edge of a rail, any bump or shaking thereof may dislodge one end of the pallet from the rail so that it can fall between the rails. Also, when conventional rails are used it is difficult to mount slats or solid sheets thereon to form either slat or solid type shelving for the reception of small, loose articles.

It is, therefore, a further object of the present invention to provide a shelving unit in which the rails are formed with inner surfaces offset below the outer surfaces to provide a safety feature for preventing pallets or the like from dropping between the rails.

According to another feature of this construction the offset rail surfaces may also function to support slats or shelving sheets with their upper faces flush with the upper outer surfaces of the rails.

The above and other objects and features of the invention will be more readily apparent from the following description, when read in connection with the accompanying drawings, in which:

Figure 4 is a perspective view of an individual rail;

Figure 5 is a perspective view of a slat;

Figure 6 is a perspective view of a hook member;

Figure 7 is a perspective view of a connector plate;

Figure 8 is a partial enlarged section on the line 8—8 of Figure 1;

Figure 9 is a partial enlarged section on the line 9—9 of Figure 1;

Figure 10 is a partial enlarged section on the line 10—10 of Figure 2; and

Figure 11 is a partial section on the line 11—11 of Figure 9.

Figure 3:
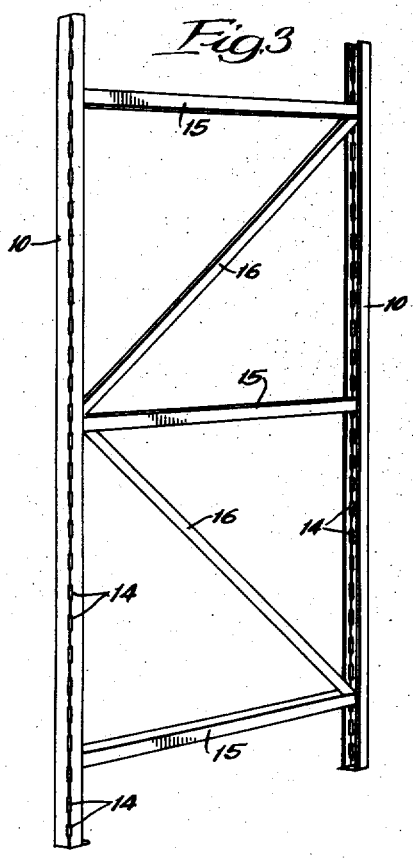
Figure 3 is a perspective view of an individual end assembly.

The shelving units of the present invention comprise essentially end members formed by vertical posts and connecting cross members and spaced horizontal rails connecting the end members and adapted to receive loads to be stored, such as pallets or the like. As shown in Figure 3, each end member comprises a pair of vertical posts 10, each of which, as best seen in Figures 9 and 10, is formed of sheet metal of channel section with a flat web 11, side flanges 12 and inwardly turned short edge flanges 13. The posts are preferably made of standard heights, such as eight feet, ten feet or any other desired unit of length, and in the assembly extend vertically to carry the vertical loads. Each posts is formed at the juncture of the side flanges 12 and the web 11 with a series of spaced openings 14 terminating in end openings spaced from the ends of the post approximately one-half the distance between adjacent openings in the series.

The posts in each end assembly are permanently and rigidly connected by cross members 15 which extend between the posts and may be permanently secured thereto by welding or the like. To give additional rigidity to the assembly, diagonal braces 16 may extend between the posts and the cross members 15 and may be welded thereto to complete a unitary rigid end assembly.

Figure 1:
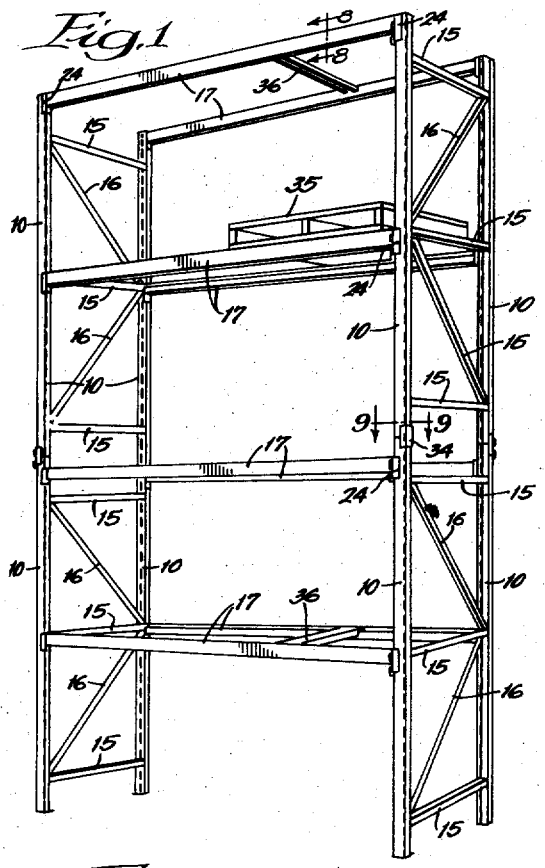
Figure 1 is a perspective view of a double height shelving unit embodying the invention.
Figure 2:
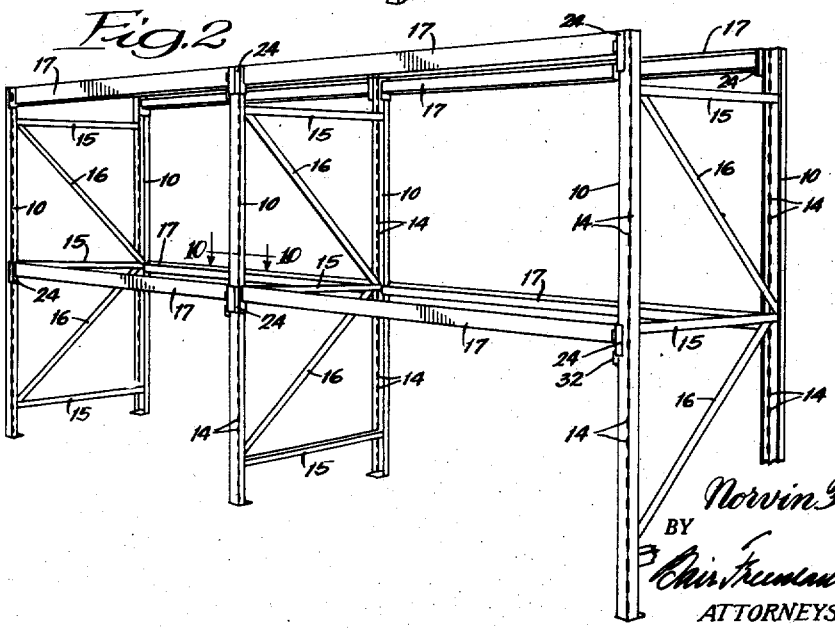
Figure 2 is a perspective view of a double width shelving unit embodying the invention.

The end assemblies may be connected in pairs by rails 17 which extend horizontally in spaced parallel relationship between the respective posts of two end assemblies, as shown in Figures 1 and 2. Each rail 17, as best seen in Figures 4 and 8, is formed of sheet metal formed into a closed section with an outer flat surface 18, an upper outer surface 19, a lower inner surface 21 joined to the surface 19 by a vertical shoulder 20, an inner flat side 22 and a bottom 23. At their ends the rails have connector plates 24 secured thereto by welding or the like to form a permanent part of the rails. Each connector plate comprises two sides joined at a right angle to fit face to face against the web 11 and one flange 12 of a post, as seen in Figures 9 and 10, and with an opening 25 between the flat sides to provide two connecting portions 26 and 27 spaced apart the same distance as the openings 14 in the post. Preferably, the lower end of each connector plate is notched as shown at 28 to receive a hook member, as described hereinafter.

To hold the connector plates securely against the posts, hook members 29, as best shown in Figures 6 and 11, are provided. Each hook member 29 comprises an elongated shank portion 31 which is of a length to span at least two openings 14 and two hook portions 32 extended from the shank 31 and adapted to project through the openings 14 in the post and the openings 25 in the connector plates. Each hook portion 32 is of a vertical length to extend through the openings as described and is formed with an inner wedging surface 33 lying at an acute angle to the shank 31 to wedge the connector plates and posts together.

In the assembly as shown in Figure 11 the hook member may be inserted from the interior of the post, as there illustrated, with the hook portions 32 projecting through the openings 14 and beyond the exterior of the post to receive the connector plates 24 or could if desired be inserted from the outside through the opening 25 in the connector plate and through the notch 28 into the openings 14 in the post. In either case, weight on the rail tends to press the connector plate downward to wedge the connector plate and post surfaces tightly together at two spaced points to form an extremely rigid assembly, but one which can easily be assembled and disassembled.

According to the present invention, single shelving units can be erected to multiple height, as shown in Figure 1, or multiple length, as shown in Figure 2, or both. In erecting a multiple height unit as shown in Figure 1, the posts of the two units are placed end to end and are held assembled by separate connector plates 34 spanning the abutting ends of the posts. These separate connector plates, as illustrated in Figure 7, each having an opening 25' between the flat sides and a notch 28' in the lower end and correspond exactly to the connector plates 24 except that they are separate units with no rails attached thereto. In mounting them, a hook member 29 is employed with the hook portions 32 thereof extending respectively through the end openings 14 on the two vertically aligned posts and the connector plate is assembled to span the abutting ends of the posts. In this way the ends of the posts are held in precise alignment to form a sturdy and extremely safe multiple height assembly. It will be appreciated, of course, that the connector plates 24 of the rails could be utilized to span the ends of the posts and connect them together, but it is preferred even where this is done to utilize the separate connector plates 34 as an increased safety feature.

To assemble complete shelving units in side by side or end to end relationship, as shown in Figure 2, it is necessary only to connect rails 17 to opposite sides of at least one of the posts in the manner best seen in Figure 10. It will be seen from this figure that connector plates 24 can be assembled at opposite sides of the web 11 of a post without interference with each other so that the rails 17 on opposite sides of the post be staggered vertically or be in horizontal alignment as they are shown in Figure 2. In this way it will be appreciated that shelving units, according to the present invention, can be assembled to any desired length and substantially any desired height.

When the erected shelving unit is to be used as a pallet rack, pallets as shown at 35 can be placed directly on the rails 17 with the space between the rails open. The pallets are normally placed so that they rest on the upper rail surfaces 19 which will hold the pallets horizontal and in which position they can easily be placed by a conventional lift truck. In the event a pallet should be placed with its edge close to the edge of the upper surface 19, it might be possible if the pallet were bumped or subjected to shaking that it would fall from the inner edge of the upper surface 19. With conventional rails the pallet would then be permitted to drop between the rails with loss of its contents and possible damage to material stored beneath it.

With rails constructed according to the present invention when this happens the edge of the pallet will be caught by the lower offset surface 21 to retain the pallet in a safe position. To insure that the pallet will be caught by the surface 21, this surface must have a horizontal width greater than the distance the edge of the pallet will swing inward as it drops to the lower offset surface of one rail while still supported on the upper surface of the other rail. Since the vertical drop is relatively small the horizontal width of the surface 21 would be calculated mathematically as quite small. For practical purposes, however, [proportions approximately as shown in Figure 8 are desirable with] the surface 21 *must have* [having] a width at least *one-third* [one-half] the height of the vertical shoulder 20. With such proportions the edge of a pallet will be safely caught and retained on the surface 21 and the titled condition of the pallet will apprise an operator that it is displaced from its intended position. However, dropping of the edge of the pallet in this manner will call to the attention of the operator the unsafe condition of the pallet and he can replace the pallet in its proper position before any likelihood of damage occurs.

The configuration of the rails also lends itself to use of the same rails as safety rails for pallet storage and for the mounting of shelving. For example, when solid shelving is desired a sheet of plywood or the like cut to the proper size can be placed on the lower inner surface 21 of opposite rails with its edges abutting against the shoulders 20 and with its upper surface substantially flush with the upper outer surface 19 of the rails. No fastenings are required since the sheet will be held in position by the shoulders 20 and no possibility of damage to the edge of the sheet or of displacement thereof can occur because the shoulders 20 will hold the sheet in position and the upper surfaces 19 will protect the sheet edges.

In some cases it may be desirable to provide slats between the rails for storage of boxes or the like which run on pallets. For this purpose slats as shown at 36 in Figures 5 and 8 may be provided. These slats as illustrated may be formed of channel-shaped sheet metal with their ends cut off to provide projecting end portions 37 of a length equal to the width of the lower surfaces 21 and a depth equal to the heighth of the shoulders 20. The lower portions of the slat ends will terminate in shoulders 38 which can abut against the inner sides 22 of the rails when the slats are assembled.

To assemble these slats on the rails they may merely be dropped between the rails at the desired spacing with the ends 37 thereof resting on the lower inner surfaces 21 and abutting against the shoulders 20 and with the offset ends 38 on the slats abutting against the inner surfaces 22 of the rails. With the slats so dropped in position, the abutment of the ends thereof against the shoulders 20 and sides 22 of the rails will limit twisting of the slats so that they will remain securely in position and yet the slats can easily be placed and removed as desired.

While one embodiment of the invention has been shown and described in detail, it will be understood that this is for the purpose of illustration only and is not to be taken as a definition of the scope of the invention, reference being had for this purpose to the appended claims.

What is claimed is:

1. In a shelving unit, a pair of end members each comprising a pair of vertical posts and cross members permanently secured to the posts and connecting them together in spaced parallel relationship, a pair of elongated rails extending between the end members in spaced parallel relationship, each of the posts having a pair of connected sides at an angle to each other and having a series of vertically spaced openings between the sides, connector plates on the ends of the rails having angularly connected surfaces fitting face to face against the sides of the posts and formed with at least one opening between said surfaces to define two connecting portions spaced apart the same distance as the openings in the posts, and a hook member connecting each connector plate to a post, each hook member having an elongated shank to span at least two openings in the post and two spaced hook portions to project through the openings in the post and the connector plate, each hook portion having an inner wedging surface at an acute angle to the shank to wedge the connector plate and the post together at two points spaced longitudinally of the post.

2. In a shelving unit, a pair of end members each comprising a pair of vertical posts and cross members permanently secured to the posts and connecting them together in spaced parallel relationship, a pair of elongated rails extending between the end members in spaced parallel relationship, each of the posts being of sheet metal of channel section with flat flanges and a flat web connecting the flanges and having a series of vertically spaced openings between each of the flanges and the web, connector plates on the ends of the rails having angularly connected surfaces fitting face to face against the web and one of the flanges respectively of the post and having at least one opening between said surfaces to define two connecting portions spaced apart the same distance as the openings in the post, and a hook member connecting each connector plate to a post, each hook member having an elongated shank to span at least two openings in the post and two spaced hook portions to project through the openings in the post and connector plate and engage the connecting portions, each hook portion having an inner wedging surface at an acute angle to the shank to wedge the connector plate and the post together at two points spaced longitudinally of the post, each post being adapted to receive two connector plates at the same level at opposite sides of the web.

3. A shelving unit for supporting pallets and the like having elongated straight bottom members, said unit comprising a pair of spaced end members each including a pair of spaced vertical posts, a pair of spaced parallel rails extending horizontally between and supported by the posts of the end members and receiving a pallet with the bottom members thereof extending transversely across and resting on the rails, each of the rails having a flat upper surface extending inwardly from the outside edge thereof on which the bottom members of a pallet normally rest and having a flat horizontal offset surface inwardly from said upper surface and spaced below the upper surface intermediate the depth of the rail and joined to the upper surface by a substantially vertical shoulder, each offset surface having a horizontal width greater than *one-third* [one-half] the height of said shoulder so that the straight bottom members of a pallet slipping from the upper surface of one rail and still supported by the upper surface of the other rail will engage and be supported by the offset surface of said one rail.

4. The unit of claim 3 in which the rails are formed of sheet metal or hollow tubular construction.

References Cited in the file of this patent or the original patent

UNITED STATES PATENTS

| | | |
|---|---|---|
| 584,082 | Nessle | June 8, 1897 |
| 984,823 | Linden | Feb. 21, 1911 |
| 1,577,066 | Medart et al. | Mar. 16, 1926 |
| 1,892,427 | Featherman | Dec. 27, 1932 |
| 1,969,656 | Marlowe | Aug. 7, 1934 |
| 2,105,868 | Thomas | Jan. 18, 1938 |
| 2,452,808 | Tucker | Nov. 2, 1948 |
| 2,468,186 | De Perret | Apr. 26, 1949 |
| 2,570,743 | Anderson | Oct. 9, 1951 |
| 2,760,650 | Franks | Aug. 28, 1956 |
| 2,772,846 | Skar | Dec. 5, 1956 |